United States Patent
Yokoi et al.

(10) Patent No.: US 12,549,272 B2
(45) Date of Patent: Feb. 10, 2026

(54) WAVELENGTH DEFRAGMENTATION APPARATUS, WAVELENGTH DEFRAGMENTATION METHOD AND PROGRAM

(71) Applicant: NTT, Inc., Tokyo (JP)

(72) Inventors: Hanami Yokoi, Tokyo (JP); Kojun Koshiji, Tokyo (JP); Yasuharu Kaneko, Tokyo (JP); Tatsuya Matsukawa, Tokyo (JP); Mika Ishizuka, Tokyo (JP); Takafumi Hamano, Tokyo (JP)

(73) Assignee: NTT, Inc., Tokyo (JP)

( * ) Notice: Subject to any disclaimer, the term of this patent is extended or adjusted under 35 U.S.C. 154(b) by 250 days.

(21) Appl. No.: 18/550,554

(22) PCT Filed: Apr. 28, 2021

(86) PCT No.: PCT/JP2021/017034
§ 371 (c)(1),
(2) Date: Sep. 14, 2023

(87) PCT Pub. No.: WO2022/230125
PCT Pub. Date: Nov. 3, 2022

(65) Prior Publication Data
US 2024/0178930 A1 May 30, 2024

(51) Int. Cl.
*H04J 14/02* (2006.01)
(52) U.S. Cl.
CPC ................... *H04J 14/02* (2013.01)

(58) Field of Classification Search
None
See application file for complete search history.

(56) References Cited

U.S. PATENT DOCUMENTS

| | | | |
|---|---|---|---|
| 8,666,252 B2* | 3/2014 | Nishihara | H04J 14/02216 398/83 |
| 10,090,923 B2* | 10/2018 | Takita | H04B 10/07957 |
| 10,193,651 B2* | 1/2019 | Takeshita | H04J 14/0267 |
| 2012/0237212 A1* | 9/2012 | Nishihara | H04J 14/0204 398/83 |
| 2015/0063800 A1* | 3/2015 | Htay | H04Q 11/0066 398/48 |

(Continued)

FOREIGN PATENT DOCUMENTS

| | | | | |
|---|---|---|---|---|
| WO | 2021/029013 | 2/2021 | | |
| WO | WO-2021029013 A1 * | 2/2021 | ........... | H04J 14/0257 |

OTHER PUBLICATIONS

Medhi, Von Neumann Architecture, 2012 (Year: 2012).*

(Continued)

*Primary Examiner* — Jai M Lee
(74) *Attorney, Agent, or Firm* — IPUSA, PLLC

(57) ABSTRACT

A wavelength defragmentation apparatus for executing wavelength reallocation for a path in an optical transmission network, the wavelength defragmentation apparatus comprising: a storage unit that stores a path information database (DB) and a wavelength allocation management DB; and a wavelength defragmentation functional unit that refers to an attribute of a path from the path information DB and performs wavelength reallocation of a path having the attribute by an operation corresponding to the attribute.

9 Claims, 21 Drawing Sheets

(56) References Cited

U.S. PATENT DOCUMENTS

| | | | |
|---|---|---|---|
| 2017/0230113 A1* | 8/2017 | Takita | H04J 14/0257 |
| 2018/0026716 A1* | 1/2018 | Takita | H04J 14/0241 |
| | | | 398/82 |
| 2022/0263578 A1 | 8/2022 | Koshiji et al. | |

OTHER PUBLICATIONS

Ankitkumar N. Patel, Philip N. Ji, Jason P. Jue, TingWan, "Defragmentation of Transparent Flexible Optical WDM (FWDM) Networks", in Proc. OFC 2011.

F. Cugini, F. Paolucci, G. Meloni, G. Berrettini, M. Secondini, F. Fresi, N. Sambo, L.Poti, and P. Castoldi, "Push-Pull Defragmentation Without Traffic Disruption in Flexible Grid Optical Networks," IEEE J. Light. Netw., vol. 31, No. 1, Jan. 2013.

* cited by examiner

Fig. 11

| PATH ID | ALLOCATION STATUS | SERVICE ATTRIBUTE | BANDWIDTH | USED WAVELENGTH NUMBER | STARTING NODE | ENDING NODE | PASS-THROUGH LINK 1 | ... | PASS-THROUGH LINK 9 | | |
|---|---|---|---|---|---|---|---|---|---|---|---|
| 1 | ALLOCATED | NORMAL | 1 | 1 | A | B | AB | | | | |
| 2 | ALLOCATED | LOW DELAY | 2 | 3 | C | I | CF | | | | |
| ... | | | | | | | | | | | |
| 30 | ALLOCATED | HIGH RELIABILITY | 1 | 23 | F | G | FJ | | | | |

Fig. 12

| WAVELENGTH NUMBER | LINK AB | LINK AD | LINK BC | LINK BE | LINK CF | LINK DE | LINK DG | ... | LINK HI |
|---|---|---|---|---|---|---|---|---|---|
| 1 | 1 | 1 | 0 | 1 | 0 | 1 | 1 | | 1 |
| 2 | 0 | 1 | 1 | 1 | 1 | 0 | 0 | | 1 |
| 80 | 0 | 1 | 0 | 0 | 0 | 0 | 0 | | 0 |

Fig. 14

| PATH ID | ALLOCATION STATUS | SERVICE ATTRIBUTE | BANDWIDTH | USED WAVELENGTH NUMBER | STARTING NODE | ENDING NODE | PASS-THROUGH LINK 1 | PASS-THROUGH LINK 2 | PASS-THROUGH LINK 3 |
|---|---|---|---|---|---|---|---|---|---|
| 1 | ALLOCATED | HIGH RELIABILITY | 1 | 1 | B | D | AB | AD | |
| 2 | UNALLOCATED | LOW DELAY | 2 | | C | I | CF | FI | |
| 3 | ALLOCATED | HIGH RELIABILITY | 1 | 3 | D | I | DE | EF | FI |
| 4 | UNALLOCATED | NORMAL | 1 | | F | H | FE | EH | |
| 5 | UNALLOCATED | LOW DELAY | 1 | | G | I | GH | HI | |
| 6 | UNALLOCATED | NORMAL | 2 | | A | H | AB | BE | EH |

Fig. 16

| PATH ID | ALLOCATION STATUS | SERVICE ATTRIBUTE | BANDWIDTH | USED WAVELENGTH NUMBER | STARTING NODE | ENDING NODE | PASS-THROUGH LINK 1 | PASS-THROUGH LINK 2 | PASS-THROUGH LINK 3 |
|---|---|---|---|---|---|---|---|---|---|
| 1 | ALLOCATED | HIGH RELIABILITY | 1 | 1 | B | D | AB | AD | |
| 2 | UNALLOCATED | LOW DELAY | 2 | | C | I | CF | FI | |
| 3 | ALLOCATED | HIGH RELIABILITY | 1 | 1 | D | I | DE | EF | FI |
| 4 | UNALLOCATED | NORMAL | 1 | | F | H | FE | EH | |
| 5 | UNALLOCATED | LOW DELAY | 1 | | G | I | GH | HI | |
| 6 | UNALLOCATED | NORMAL | 2 | | A | H | AB | BE | EH |

Fig. 18

| PATH ID | ALLOCATION STATUS | SERVICE ATTRIBUTE | BANDWIDTH | USED WAVELENGTH NUMBER | STARTING NODE | ENDING NODE | PASS-THROUGH LINK 1 | PASS-THROUGH LINK 2 | PASS-THROUGH LINK 3 |
|---|---|---|---|---|---|---|---|---|---|
| 1 | ALLOCATED | HIGH RELIABILITY | 1 | 1 | B | D | AB | AD | |
| 2 | ALLOCATED | LOW DELAY | 2 | 2, 3 | C | I | CF | FI | |
| 3 | ALLOCATED | HIGH RELIABILITY | 1 | 1 | D | I | DE | EF | FI |
| 4 | UNALLOCATED | NORMAL | 1 | | F | H | FE | EH | |
| 5 | ALLOCATED | LOW DELAY | 1 | 1 | G | I | GH | HI | |
| 6 | UNALLOCATED | NORMAL | 2 | | A | H | AB | BE | EH |

Fig. 20

| PATH ID | ALLOCATION STATUS | SERVICE ATTRIBUTE | BANDWIDTH | USED WAVELENGTH NUMBER | STARTING NODE | ENDING NODE | PASS-THROUGH LINK 1 | PASS-THROUGH LINK 2 | PASS-THROUGH LINK 3 |
|---|---|---|---|---|---|---|---|---|---|
| 1 | ALLOCATED | HIGH RELIABILITY | 1 | 1 | B | D | AB | AD | |
| 2 | ALLOCATED | LOW DELAY | 2 | 2, 3 | C | I | CF | FI | |
| 3 | ALLOCATED | HIGH RELIABILITY | 1 | 1 | D | I | DE | EF | FI |
| 4 | ALLOCATED | NORMAL | 1 | 4 | F | H | EF | EH | |
| 5 | ALLOCATED | LOW DELAY | 1 | 1 | G | I | GH | HI | |
| 6 | ALLOCATED | NORMAL | 2 | 2, 3 | A | H | AB | BE | EH |

WAVELENGTH DEFRAGMENTATION APPARATUS, WAVELENGTH DEFRAGMENTATION METHOD AND PROGRAM

TECHNICAL FIELD

The present invention relates to a technique for reallocating an optical path by using wavelength defragmentation in the wavelength design of an optical transmission network.

BACKGROUND ART

In the optical transmission network, the communication data is handled by light, and the communication demand present in the optical transmission network is called an optical path. The optical path is accommodated in a wavelength available in the optical fiber, but it is necessary to allocate the same wavelength to the optical path between the starting node and the ending node, and this is called a wavelength continuity constraint.

When a plurality of optical paths are accommodated in each wavelength in the optical fiber so as to satisfy the wavelength continuity restriction, the occurrence and withdrawal of the optical paths are repeated through the long-term operation of the optical transmission network, thereby generating a fragmented state, and the utilization efficiency of the wavelength tends to be lowered.

In order to improve the utilization efficiency of the wavelength, a wavelength defragmentation (wavelength reallocation) system has been studied. As a prior art, a defragmentation technique for reducing the maximum used wavelength number by changing the route is disclosed in NPL 1.

The "reduction of the maximum used wavelength number" means that the optical path is reallocated to a wavelength having a smaller wavelength number when the optical path is reallocated by defragmentation. In wavelength allocation for newly allocating an optical path to a wavelength, generally allocation is performed according to the First-Fit method (hereinafter referred to as the FF method). Therefore, by performing the operation so that the maximum used wavelength number becomes small at the time of defragmentation, fragments are hardly generated at the time of allocating a new optical path later, improving the wavelength utilization efficiency.

CITATION LIST

Non Patent Literature

[NPL 1] Ankitkumar N. Patel, Philip N. Ji, Jason P. Jue, TingWan, "Defragmentation of Transparent Flexible Optical WDM (FWDM) Networks", in Proc. OFC 2011.

SUMMARY OF INVENTION

Technical Problem

In recent years, the types of communication services have become more diverse, and there are optical paths with various quality classes based on the required quality of service.

Since the attributes of the optical paths are not considered in the prior art, the wavelength defragmentation using the route change is performed uniformly for all the optical paths. Therefore, there is a possibility that the quality of the optical path is impaired by the wavelength defragmentation. In addition, there may be optical paths that cannot be subjected to wavelength defragmentation to meet the required quality of optical paths, thus making it difficult to improve wavelength accommodation efficiency through wavelength defragmentation.

For example, in a path accommodating a highly reliable service which is not allowed to be interrupted instantaneously, the defragmentation cannot be performed because of the occurrence of the instantaneous interruption in the conventional technology. In addition, in a path accommodating a service requiring low-delay communication, the quality of service may be impaired if rerouting is performed during defragmentation.

The present invention has been contrived in view of the foregoing points, and an object of the present invention is to provide a technique for wavelength defragmentation that takes into account the attributes of optical paths.

Solution to Problem

The disclosed technique is a wavelength defragmentation apparatus that executes wavelength reallocation for a path in an optical transmission network, the wavelength defragmentation apparatus including:
  a storage unit that stores a path information database (DB) and a wavelength allocation management DB; and
  a wavelength defragmentation functional unit that refers to an attribute of a path from the path information DB and performs wavelength reallocation of a path having the attribute by an operation corresponding to the attribute.

Advantageous Effects of Invention

According to the disclosed technique, wavelength defragmentation can be performed in consideration of the attributes of optical paths.

BRIEF DESCRIPTION OF DRAWINGS

FIG. 11 is a diagram showing an image of a path information DB.

FIG. 12 is a diagram showing an image of a wavelength allocation management DB.

FIG. 14 is a diagram showing the path information DB in a specific example of S20.

FIG. 16 is a diagram showing the path information DB in a specific example of S30.

FIG. 18 is a diagram showing the path information DB in a specific example of S40.

FIG. 20 is a diagram showing the path information DB in a specific example of S40.

DESCRIPTION OF EMBODIMENTS

Hereinafter, an embodiment of the present invention (the present embodiment) will be described with reference to drawings. The embodiment described below is a mere example, and embodiments in which the present invention is implemented are not limited to the following embodiment. In the present embodiment, an "optical path" may be referred to as a "path", a "wavelength path", or the like.

Overview of Embodiment

In the present embodiment, wavelength defragmentation is performed while satisfying the required quality of an optical path, by changing the wavelength reallocation method in accordance with an attribute of the optical path in consideration of the attribute of the optical path. Specifically, different operations are performed for high-reliability paths where instantaneous path interruptions are not allowed, low-delay paths with strict delay requirements, and normal paths with low quality requirements. However, attributes of optical paths are not limited to these three types.

The configuration and operations of the system and the device for realizing the above-mentioned wavelength defragmentation will be described below.

System Configuration

Figure 1:
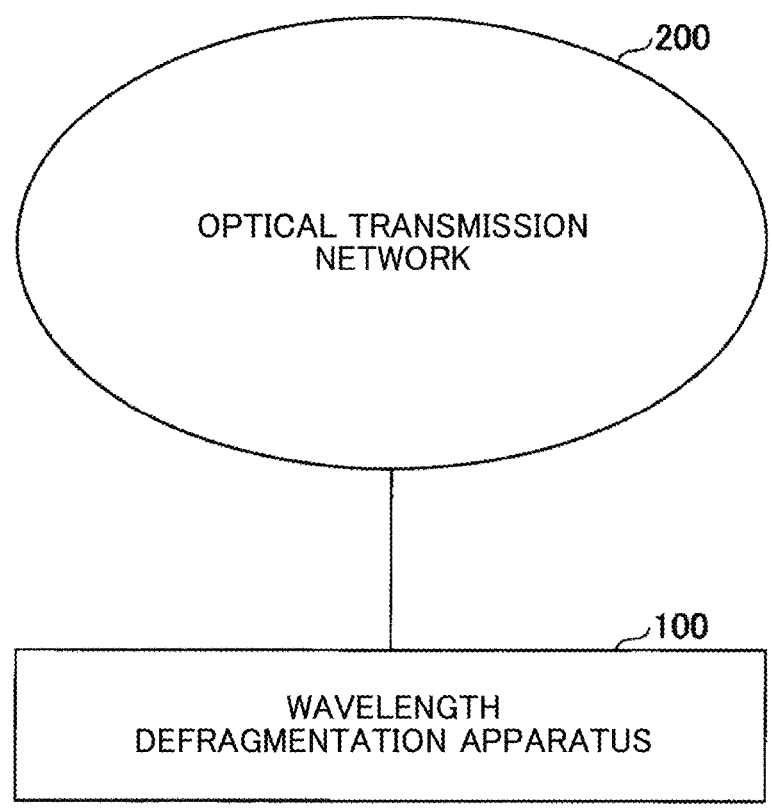
FIG. 1 is an overall configuration diagram of a system according to an embodiment of the present invention.

FIG. 1 shows an example of an overall configuration of the system according to the present embodiment. As shown in FIG. 1, this system includes a wavelength defragmentation apparatus 100 and an optical transmission network 200.

The optical transmission network 200 is a backbone network such as an IP communication network for implementing communication by an optical signal. The wavelength defragmentation apparatus 100 is a device having a function according to the present invention, and performs processing for wavelength defragmentation (wavelength reallocation) on the optical transmission network 200.

The wavelength defragmentation apparatus 100 may physically be a single device (computer) or may physically be configured by connecting a plurality of devices to a network. The wavelength defragmentation apparatus 100 may have a function provided on a cloud.

Device Configuration

Figure 2:
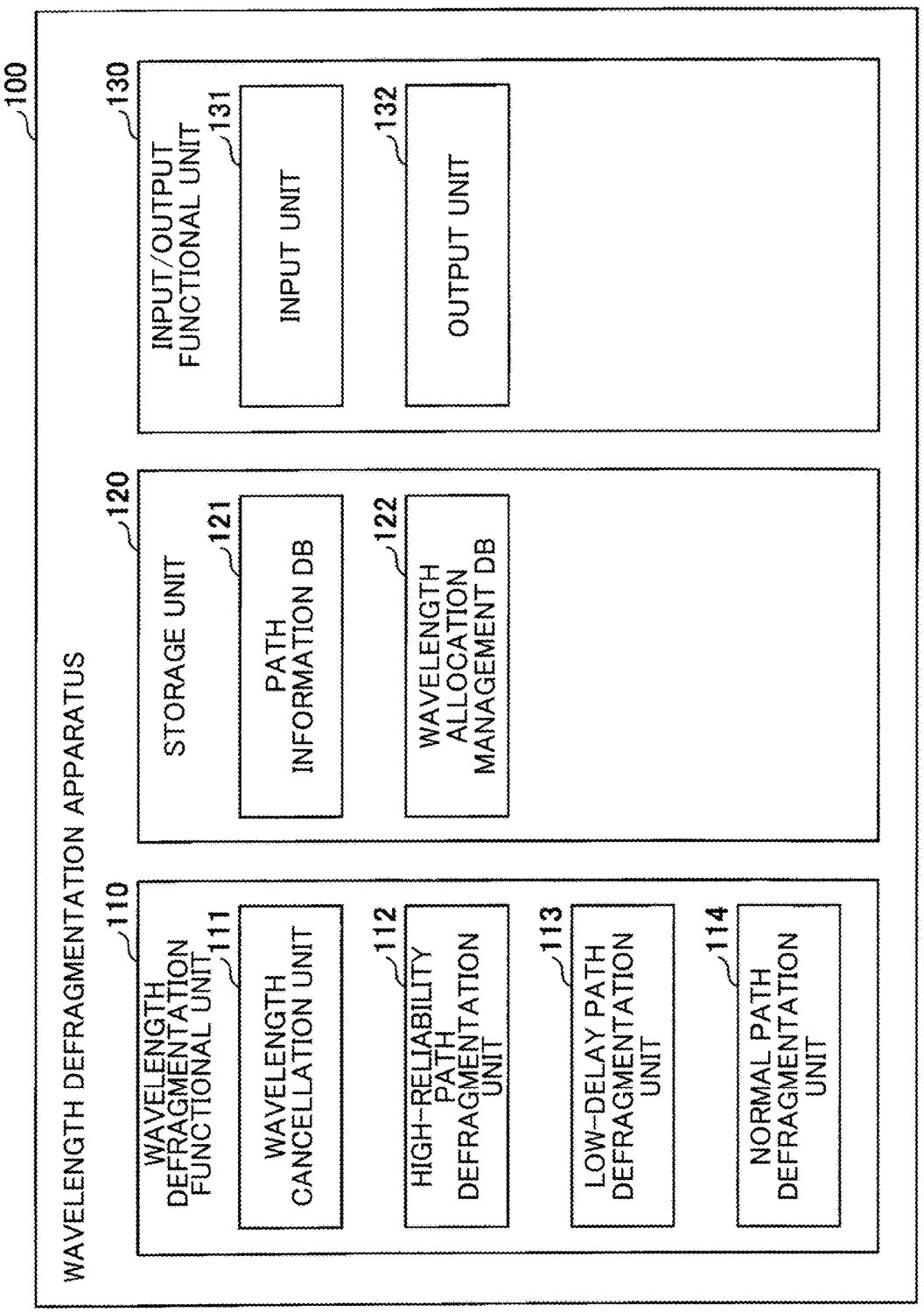
FIG. 2 is a configuration diagram of a wavelength defragmentation apparatus.

FIG. 2 shows an example of functional configuration of the wavelength defragmentation apparatus 100. As shown in FIG. 2, the wavelength defragmentation apparatus 100 includes a wavelength defragmentation functional unit 110, a storage unit 120, and an input/output functional unit 130.

The wavelength defragmentation functional unit 110 includes a wavelength cancellation unit 111, a high-reliability path defragmentation unit 112, a low-delay path defragmentation unit 113, and a normal path defragmentation unit 114. The storage unit 120 includes a path information DB 121 and a wavelength allocation management DB 122. The input/output functional unit 130 includes an input unit 131 and an output unit 132.

It should be noted that the above-mentioned functional configuration is an example and does not preclude functions and configurations other than those described above. An overview of the operation of each unit in the wavelength defragmentation apparatus 100 is described below.

Wavelength Defragmentation Functional Unit 110

The wavelength canceling unit 111 cancels an allocated wavelength according to attribute information of the path information DB 121 to be described later.

The high-reliability path defragmentation unit 112 selects a wavelength reallocation destination of a path having a highly reliable attribute on the basis of the information of the path information B 121 and the wavelength allocation management DB 122 to be described later, and performs path replacement.

The low-delay path defragmentation unit 113 selects a wavelength reallocation destination of a path having a low-delay attribute, on the basis of the information of the path information DB 121 and the wavelength allocation management DB 122, and performs path replacement.

The normal path defragmentation unit 114 selects a wavelength reallocation destination and a route of a path whose attribute is normal, on the basis of the information of the path information DB 121 and the wavelength allocation management DB 122, and performs replacement of the path including rerouting.

Storage Unit 120

The path information DB 121 stores path information such as an ID and allocation information of a wavelength path, route information, a service attribute, and a wavelength number allocated to the wavelength path. The wavelength allocation management DB 122 stores the allocation status of the wavelength of each link constituting the optical transmission network 200.

Input/Output Functional Unit 130

The input unit 131 inputs a link to be subjected to wavelength reallocation, and inputs whether wavelength reallocation can be executed or not. The output unit 132 outputs the execution result of each unit of the wavelength defragmentation apparatus 100 and the information of each DB of the storage unit 120.

Overall Operation

Figure 3:
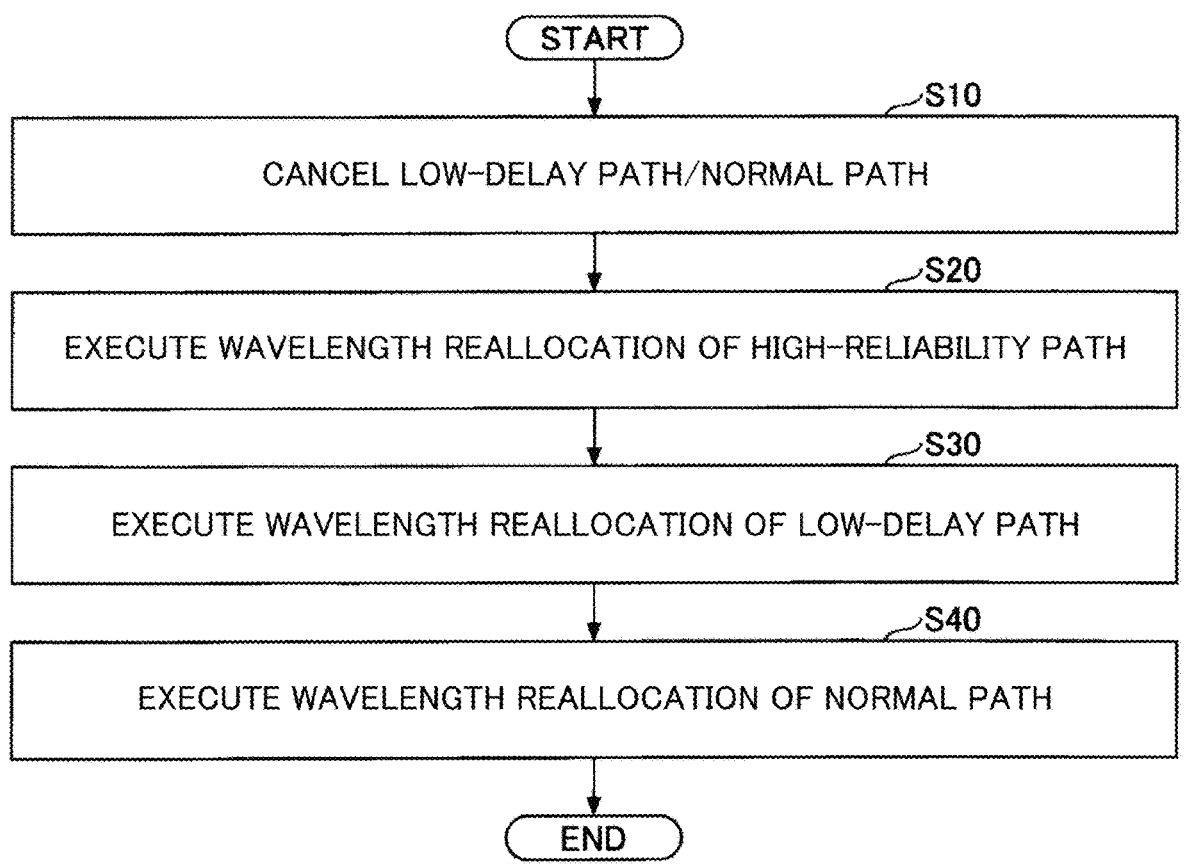
FIG. 3 is a flowchart showing an overall operation.

FIG. 3 is a flowchart showing an overall operation of the wavelength defragmentation apparatus 100. In the present embodiment, when a decrease in the wavelength utilization efficiency of the entire optical transmission network 200 is detected by some means, the wavelength allocation management DB 122 and the path information DB 121 are set, and thereafter, execution of wavelength reallocation is instructed to the wavelength defragmentation apparatus 100. The wavelength defragmentation apparatus 100 that is instructed to perform wavelength reallocation executes the processing of the wavelength defragmentation on the optical transmission network 200 in the procedure shown in the flowchart of FIG. 3.

In S10 (step 10), the wavelength canceling unit 111 cancels low-delay paths and normal paths. In S20, the high-reliability path defragmentation unit 112 executes wavelength reallocation of high-reliability paths. In S30, the low-delay path defragmentation unit 113 executes wavelength reallocation of the low-delay paths. In S40, the normal path defragmentation unit 114 executes wavelength reallocation of the normal paths. The operation of each of the steps S10 to S40 shown in FIG. 3 will now be described with reference to the flowchart.

S10: Cancellation of Low-Delay Paths and Normal Paths

Figure 4:
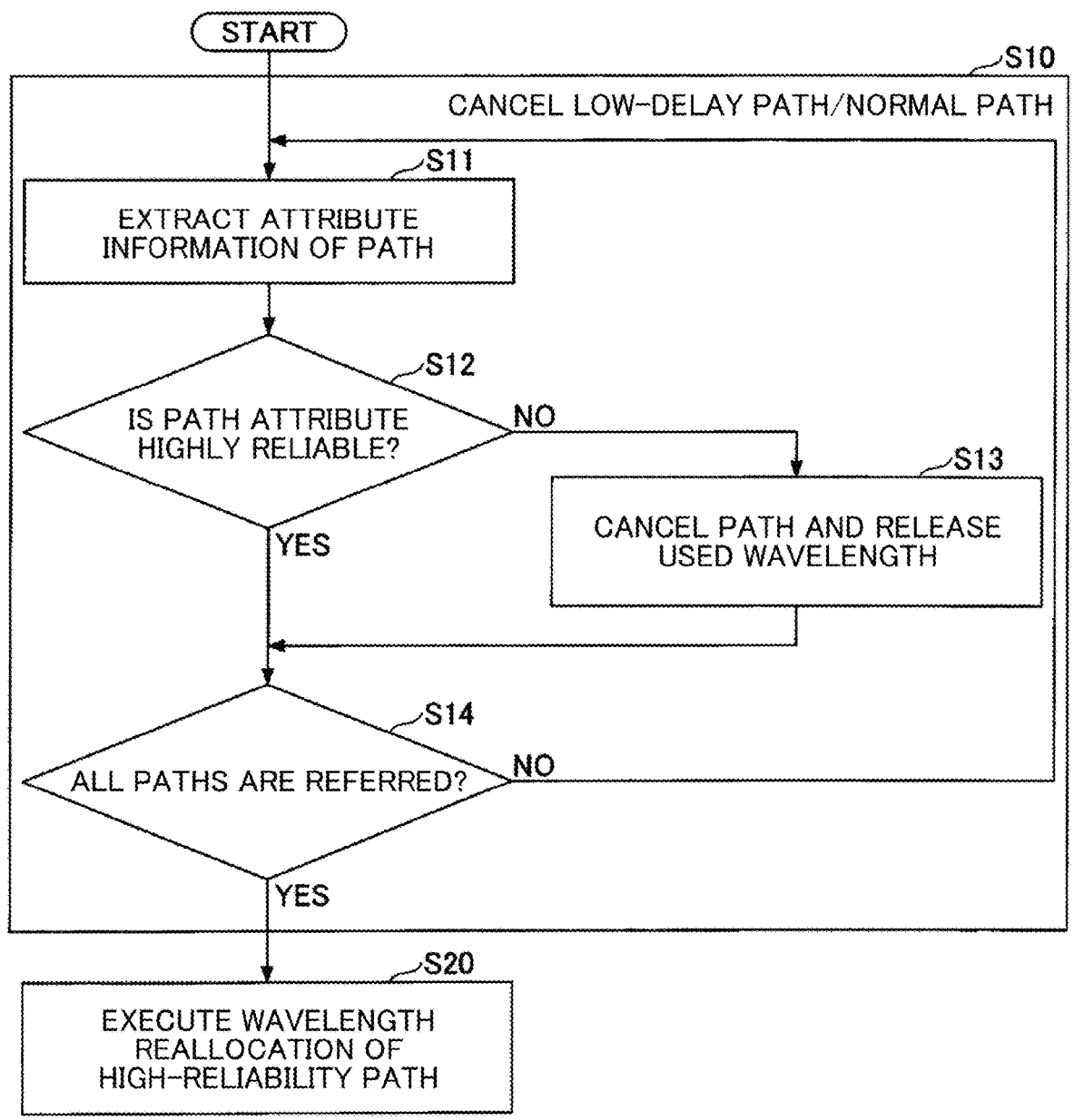
FIG. 4 is a flowchart of processing for canceling a low-delay path and a normal path.

FIG. 4 is a flowchart of processing for canceling low-delay paths and normal paths. In S11, the wavelength cancellation unit 111 sequentially extracts attribute information of a path from the path information DB 121. In S12, if the attribute of the path is highly reliable, the processing proceeds to S14, and if the attribute of the path is not highly reliable (that is, if the attribute of the path is low-delay or normal), the processing proceeds to S13.

In S13, the wavelength cancellation unit 111 cancels the path whose attribute is low-delay or normal, and releases a used wavelength. When canceling the path, the allocation status of the path information DB 121 and the wavelength allocation management DB 122 are changed. If all the paths have been referenced (YES in S14), the processing proceeds to S20, and if there are unreferred paths (NO in S14), the processing returns to S11, to perform the above-described processing on another path.

S20: Wavelength Reallocation of High-Reliability Paths

Figure 5:
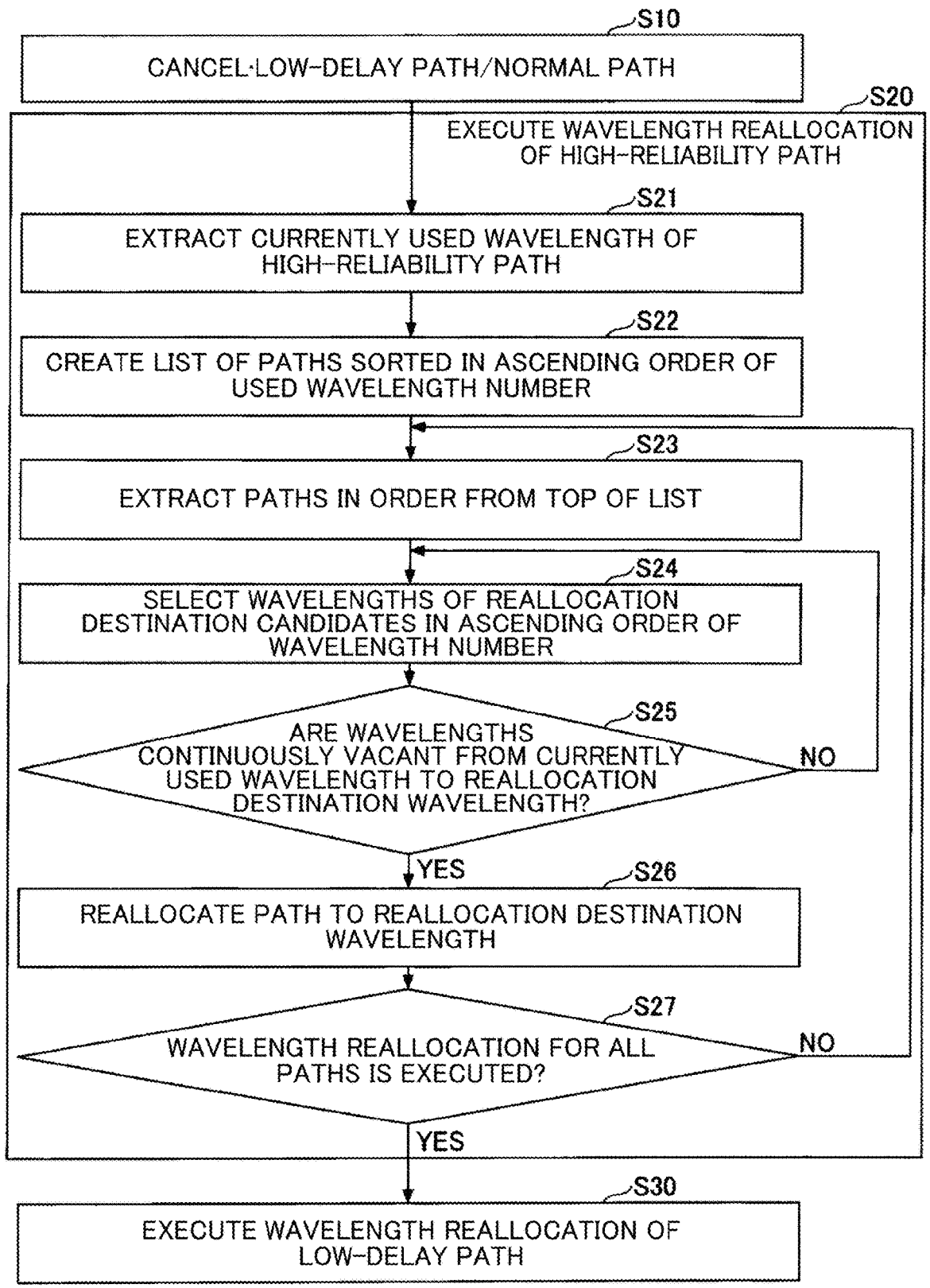
FIG. 5 is a flowchart of wavelength reallocation execution processing for a high-reliability path.

FIG. 5 is a flowchart of processing for wavelength reallocation of high-reliability paths. A specific example of the flowchart will be described later. The high-reliability path defragmentation unit 112 extracts currently used wavelengths of the high-reliability paths from the path information DB 121 in S21, and creates a list of the paths sorted in ascending order of used wavelength number in S22.

In S23, the high-reliability path defragmentation unit 112 sequentially extracts a path in order from the top of the list. In S24, the wavelength of a reallocation candidate is selected in order from the wavelength of the smaller wavelength number, and in S25, it is determined whether or not wavelengths of the route described in the path information DB 121 are continuously available from the currently used wavelength to the reallocation destination wavelength. If the result is Yes, the processing proceeds to S26, and if the result is No, the processing returns to S24.

The high-reliability path defragmentation unit 112 reallocates a path to the reallocation destination wavelength in S26, determines in S27 whether or not wavelength reallocation is executed on all paths. If the result is Yes, the processing proceeds to S30, and if the result is No, the processing returns to S23.

S30: Wavelength Reallocation of Low-Delay Path

Figure 6:
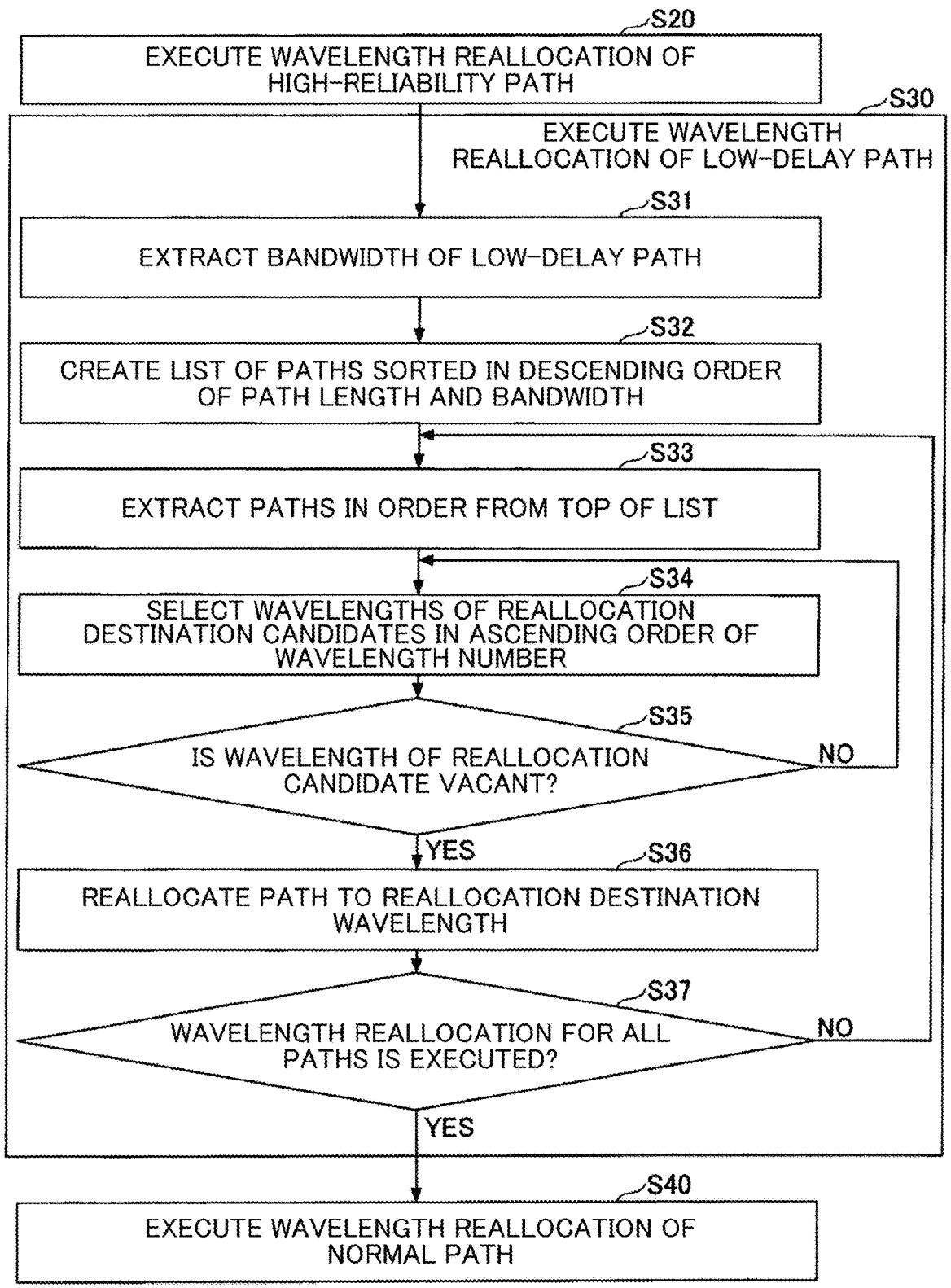
FIG. 6 is a flowchart of wavelength reallocation execution processing for a low-delay path.

FIG. 6 is a flowchart of wavelength reallocation processing for a low-delay path. A specific example of the flowchart will be described later. The low-delay path defragmentation unit 113 extracts the bandwidths of the low-delay paths from the path information DB 121 in S31, and, in S32, creates a list of the paths sorted in descending order of path length and bandwidth.

The low-delay path defragmentation unit 113 sequentially extracts a path in order from the top of the list in S33, selects the wavelengths of reallocation destination candidates in ascending order of wavelength number in S34, and determines in S35 whether or not the wavelengths of the reallocation destination candidates are available in the route described in the path information DB 121. If the result is Yes, the processing proceeds to S36, and if the result is No, the processing returns to S34.

The low-delay path defragmentation unit 113 reallocates a path to the reallocation destination wavelength in S36, and determines in S37 whether or not wavelength reallocation is executed on all paths. If the result is Yes, the processing proceeds to S40, and if the result is No, the processing returns to S33.

S40: Wavelength Reallocation of Normal Path

Figure 7:
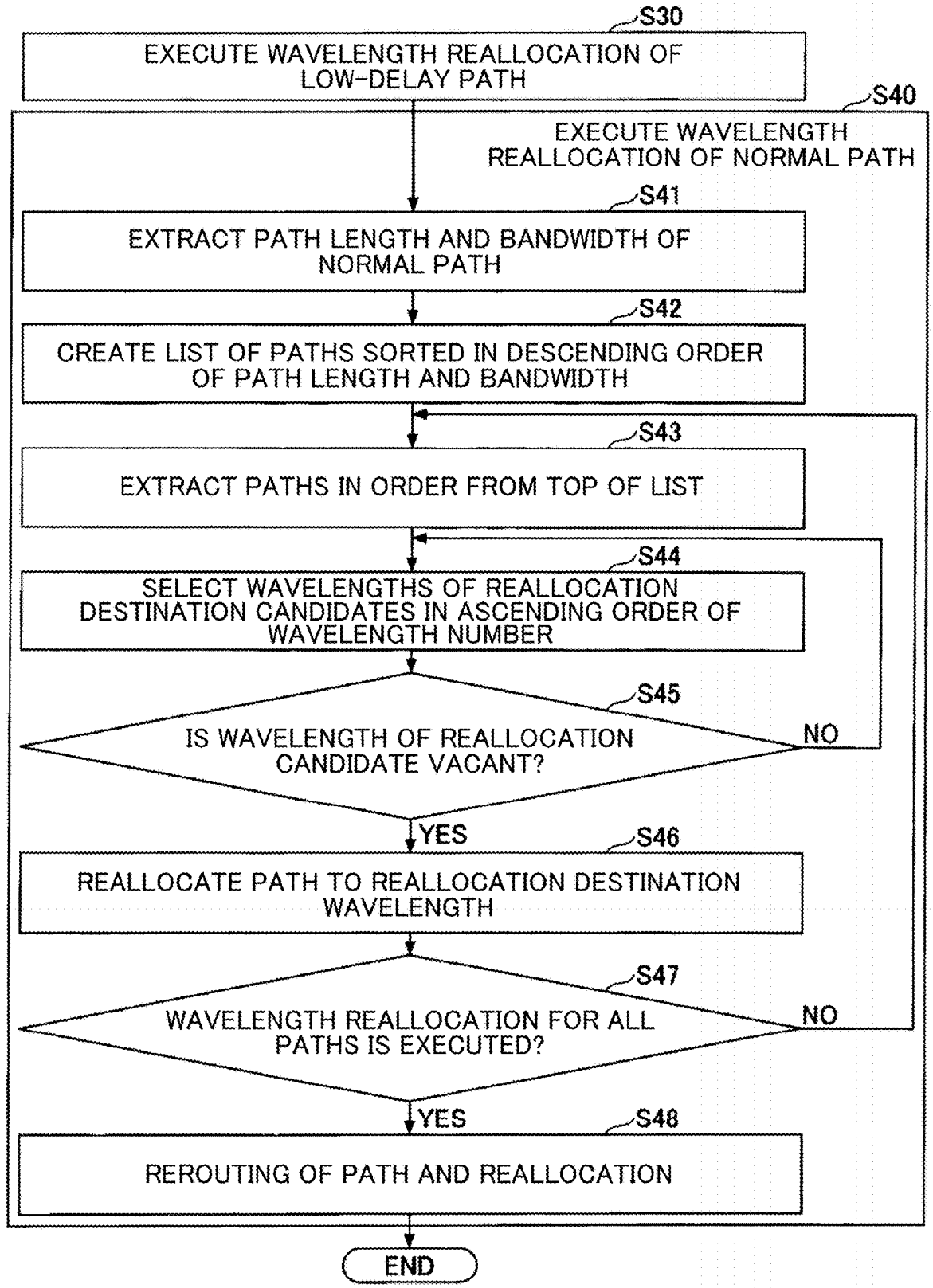
FIG. 7 is a flowchart of wavelength reallocation execution processing for a normal path.

FIG. 7 is a flowchart of normal path wavelength reallocation processing. A specific example of the flowchart will be described later. The normal path defragmentation unit 114 extracts path lengths and bandwidths of the normal paths from the path information DB 121 in S41, creates a list of the paths sorted in descending order of path length and bandwidth in S42, and sequentially extracts a path in order from the top of the list in S43.

The normal path defragmentation unit 114 selects the wavelengths of reallocation destination candidates in ascending order of wavelength number in S44, and determines in S45 whether the wavelengths of the reallocation destination candidates are available in the route described in the path information DB 121. If the result is Yes, the processing proceeds to S46, and if the result is No, the processing returns to S44.

The normal path defragmentation unit 114 reallocates a path to the reallocation destination wavelength in S46, and determines in S47 whether or not wavelength reallocation is executed on all paths. If the result is Yes, the processing proceeds to S48, and if the result is No, the processing returns to S43. In S48, path rerouting and reallocation are performed. Path rerouting and reallocation will be described with reference to FIG. 8.

The normal path defragmentation unit 114 extracts currently used wavelengths and bandwidths of the normal paths from the path information DB 121 in S481, creates a list of the paths sorted in descending order of the used wavelengths and bandwidths in S482, and sequentially extract a path in order from the top of the list in S483.

The normal path defragmentation unit 114 selects the wavelengths of reallocation destination candidates in ascending order of wavelength number in S484, extracts a link whose wavelength is not used among the wavelengths of the reallocation destination candidates in S485, and determines in S486 whether or not the path using the unused link can be rerouted. If the result is Yes, the processing proceeds to S487, and if the result is No, the processing returns to S484.

The normal path defragmentation unit 114 changes the route and reallocates a path to a reallocation destination wavelength in S487, and in S488, ends the processing if there are no reallocatable paths, or returns the processing to S483 if there are reallocatable paths.

Priority of S30, S40

In any of the steps S30 to S40, the priority of reallocation is determined according to the length of the route through which the wavelength path passes from the starting node to the ending node (the length of the wavelength path) and the descending order of bandwidth used by the path. Specifically, the determination may be made as in a or b described below.
  a. After the priority is determined in descending order of length of the route through which the wavelength path passes from the starting node to the ending node (length of the wavelength path), if the length of the wavelength path is the same, the priority is determined in descending order of bandwidth used by the path.
  b. After determining the priority in descending order of bandwidth used by the path, if the bandwidth is the same, the priority is determined in descending order of the length of the wavelength path.

The method of determining the priority is not limited to these methods. For example, the priority of the wavelength path may be determined randomly.

However, the method of determining the priority is not limited to the above methods, but the priority may be determined by a method other than the above methods.

EXAMPLES

Figure 9:
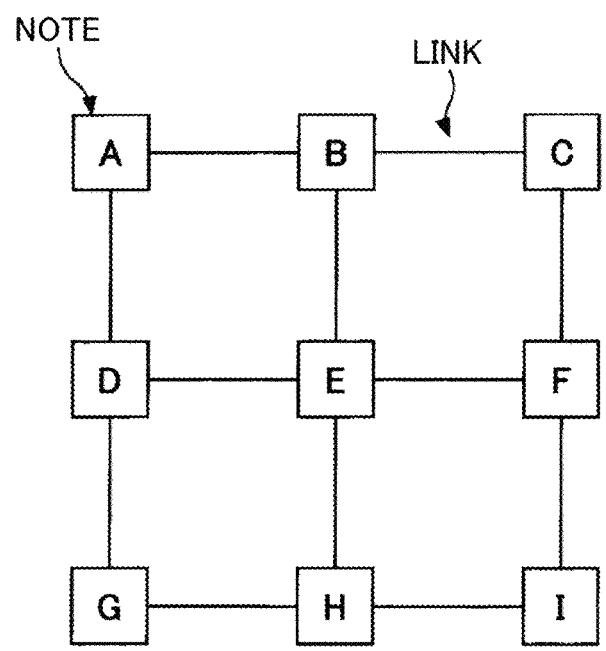
FIG. 9 is a diagram showing an image of an overall configuration of optical transmission network.

Examples of the wavelength defragmentation processing performed by the wavelength defragmentation apparatus 100 will be described below. FIG. 9 shows an overall configuration of the optical transmission network according to the present example. As shown in FIG. 9, the optical network of the present example has a configuration in which nodes A to I are connected by links as shown in the diagram. In the present example, wavelength allocation performed until wavelength defragmentation is executed, is executed by the FF method. The FF method is a method of allocation in ascending order of wavelength numbers.

Figure 10:
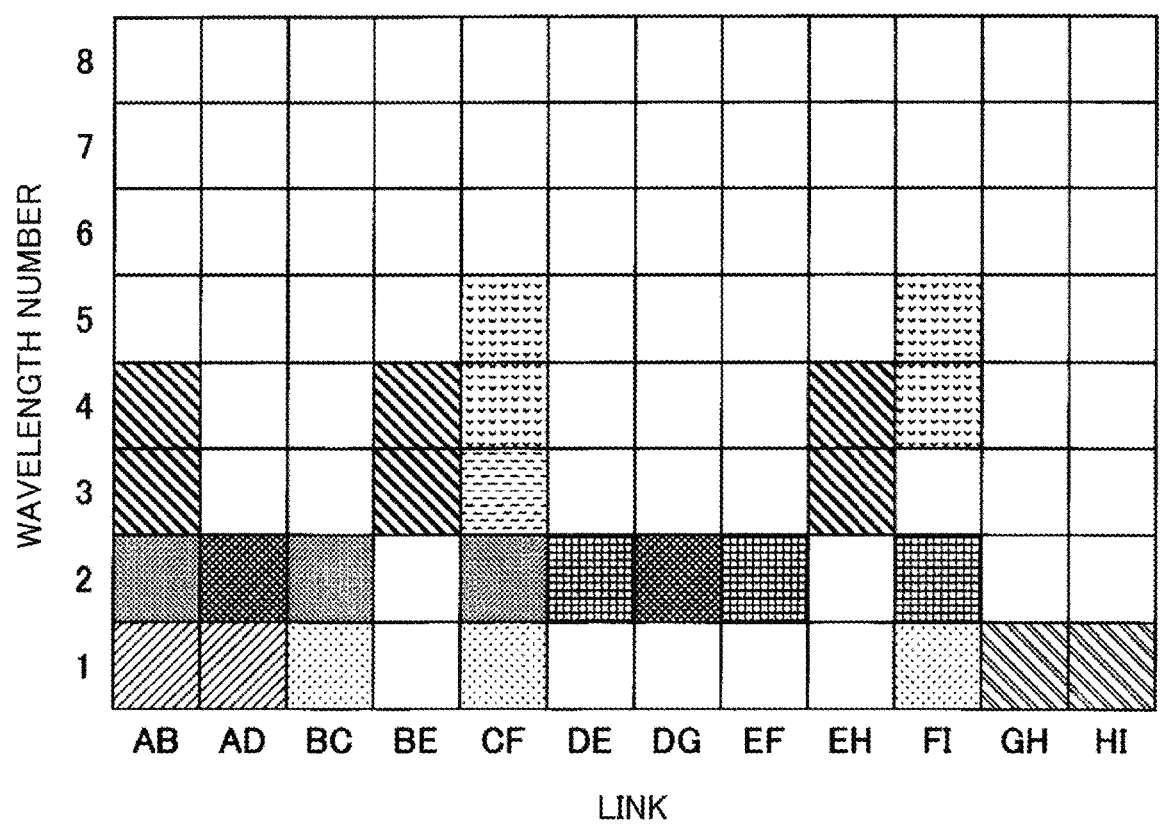
FIG. 10 is a diagram showing a wavelength allocation image of the optical transmission network.

FIG. 10 shows a wavelength allocation image of the optical transmission network. In FIG. 10, the same hatching indicates the same path. For example, the G-H-I path uses a wavelength having wavelength number 1.

FIG. 11 shows an example of wavelength path information stored in the path information DB 121. It should be noted that FIG. 11 is an example; items and storage formats are not limited thereto. In the example shown in FIG. 11, a path ID, an allocation status, a service attribute, a bandwidth, a used wavelength number, a starting node, an ending node, and a pass-through link are stored.

FIG. 12 shows an example of information stored in the wavelength allocation management DB 122. As shown in FIG. 12, the wavelength allocation management DB 122 stores, as the wavelength allocation status of each link constituting the optical transmission network, information (1: Allocation, 0: No allocation) indicating whether or not the wavelength having a wavelength number is allocated to each link for each wavelength number. The items and storage formats are not limited thereto.

As described above, when a decrease in the wavelength utilization efficiency of the entire optical transmission network is detected by some means, the wavelength allocation management DB 122 and the path information DB 121 are set, and then wavelength defragmentation is executed. In the wavelength defragmentation, as shown in FIG. 3, the low-delay paths and the normal paths are canceled (S10), wavelength reallocation of the high-reliability paths is executed (S20), wavelength reallocation of the low-delay paths is executed (S30), and wavelength reallocation of the normal paths is executed (S40). Specific examples of S20 to S40 will be described hereinafter.

Specific Example of S20

Figure 13:
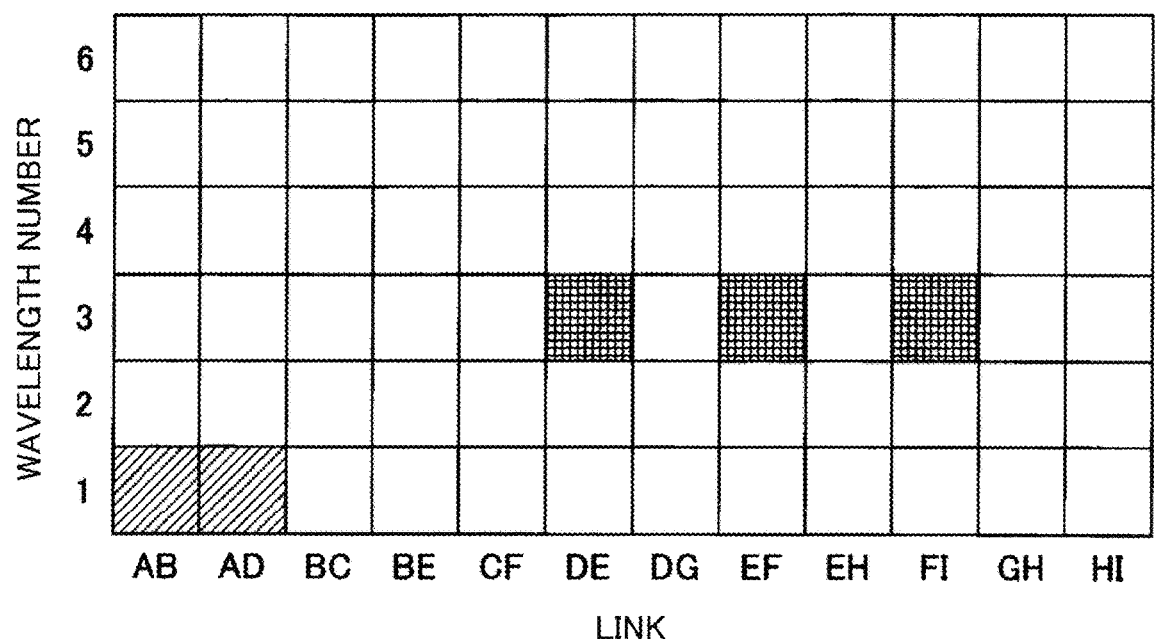
FIG. 13 is a diagram showing a usage of a wavelength in a specific example of S20.

First, a specific example of S20 (wavelength reallocation of the high-reliability path) under the usage of the wavelengths shown in FIG. 13 will be described. The path information DB 121 at this time is as shown in FIG. 14. For example, it can be seen from FIGS. 13 and 14 that the allocated path with path ID 1 is a path of the B-A-D route using the wavelength with wavelength number 1, and that the service attribute is "highly reliable".

The procedure described below is a more specific version of the flowchart procedure shown in FIG. 5. In the following description of the procedure, step numbers in the flowchart shown in FIG. 5 will be described as appropriate.

The high-reliability path defragmentation unit 112 extracts paths having a highly reliable attribute from the path information DB 121 shown in FIG. 14 (S21), and creates a list of the paths sorted in ascending order of used wavelength number on the basis of the currently used wavelength number (S22).

In the specific example, the wavelength path having path ID 1 (hereinafter referred to as path 1) and path 3 are stored in order from the top of the list.

The high-reliability path defragmentation unit 112 then searches for the wavelengths of wavelength path reallocation destination candidates in order from the top of the list (S23, S24, S25). In the specific example, first, the wavelengths of reallocation candidates are searched for path 1 that is stored at the top of the list.

Here, since path 1 already uses the smallest wavelength number, the wavelengths of the reallocation candidates are not searched.

Subsequently, the high-reliability path defragmentation unit 112 searches for the wavelengths of reallocation destination candidates with respect to the second wavelength path stored in the list. In the specific example, the wavelengths of the reallocation candidates is searched for path 3. Since the high-reliability path contains a highly reliable service in which instantaneous interruption of the path is not allowed, the Push-Pull technology for uninterrupted defragmentation "reference literature 1: F. Cugini, F. Paolucci, G. Meloni, G. Berrettini, M. Secondini, F. Fresi, N. Sambo, L. Poti, and P. Castoldi, "Push-Pull Defragmentation Without Traffic Disruption in Flexible Grid Optical Network," IEEE J. Light. Netw., vol. 31, No. 1, January 2013." is used to perform defragmentation.

In order to execute the defragmentation by the Push-Pull technology, it is necessary that all wavelengths from the currently used wavelength to the reallocation destination wavelength are not continuously used. Therefore, by referring to the wavelength allocation management DB 122, it is confirmed whether or not the wavelengths are continuously available up to the currently used wavelength in ascending order of wavelength number, and the wavelength having the smallest wavelength number that is capable of ensuring that the wavelengths are continuously available is selected as the reallocation destination wavelength.

In the specific example, since the currently used wavelength for path 3 is 3 and wavelengths 1 to 2 are continuously available, the wavelength 1 is selected as the reallocation destination wavelength of path 3.

Since the reallocation destination wavelength is selected, the high-reliability path defragmentation unit 122 reallocates the wavelength path to the reallocation destination wavelength (S26). In so doing, the high-reliability path defragmentation unit 122 changes the used wavelength number of the reallocation target path of the path information DB 121. Also, the wavelength allocation status of the wavelength allocation management DB 122 is changed.

In the specific example, since wavelength 1 is selected as the reallocation destination wavelength of path 3 having bandwidth 1, the path accommodated in wavelength 3 is canceled, and a new path is created for wavelength 1.

The above operation is similarly executed for all the paths in the list (S27).

Specific Example of S30

Figure 15:
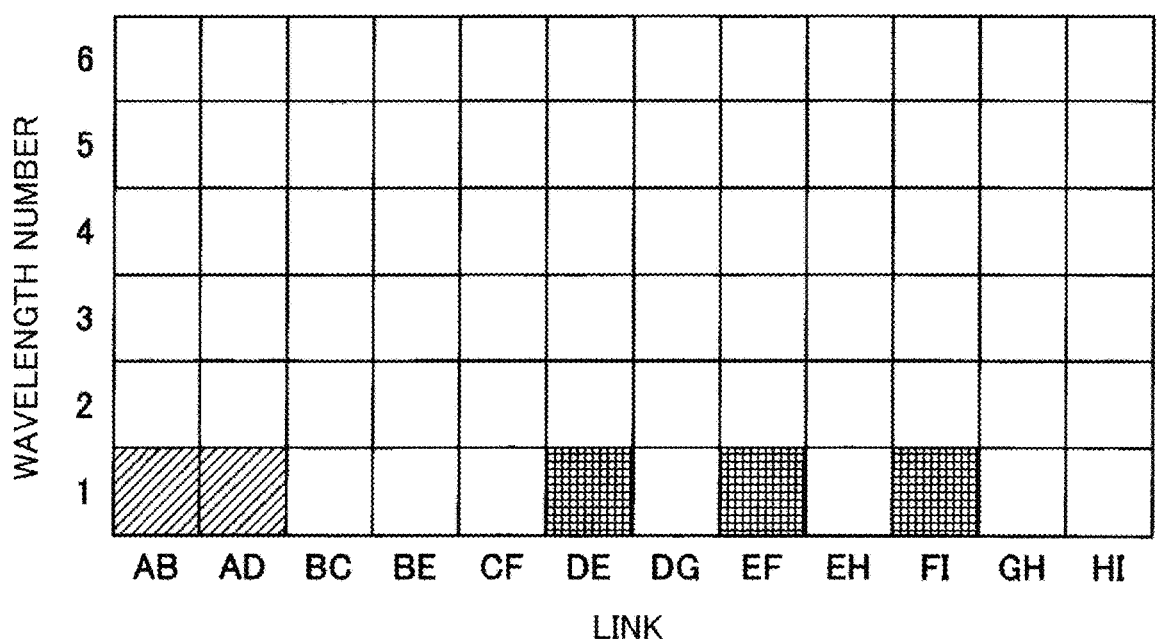
FIG. 15 is a diagram showing a usage of a wavelength in a specific example of S30.

Next, a specific example of S30 (wavelength reallocation of the low-delay path) under the usage of the wavelength shown in FIG. 15 will be described. The path information DB 121 at this time is as shown in FIG. 16.

The procedure described below is a more specific version of the flowchart procedure shown in FIG. 6. In the following description of the procedure, step numbers in the flowchart shown in FIG. 6 will be described as appropriate.

The low-delay path defragmentation unit 112 extracts paths having low-delay attributes from the path information DB 121 shown in FIG. 16 (S31), and creates a list of the paths sorted in descending order of bandwidth and path length (S32). In the specific example, paths 2 and 5 are stored in order from the top of the list.

Next, the low-delay path defragmentation unit 112 searches for the wavelengths of wavelength path reallocation destination candidates in order from the top of the list (S33, S34, S35).

In the specific example, first, the wavelengths of reallocation candidates are searched for path 2 that is stored at the top of the list. At this time, since the low-delay path contains a service for minimizing the delay, it is necessary for the path to pass through the shortest route. Therefore, the path is accommodated in the same route as the route stored in the path information DB 121.

In so doing, the low-delay path defragmentation unit 112 refers to the wavelength allocation management DB 122 and the path information DB 121 to confirm whether or not a wavelength is available in the route described in the path information DB 121 in ascending order of wavelength number, and selects a available wavelength having the smallest wavelength number as the reallocation destination wavelength. In the specific example, since a link CF and a link FI can be used at wavelength 2 for path 2 having bandwidth of 1, wavelength 2 is selected as the reallocation destination wavelength of path 2.

Thus, since the reallocation destination wavelength is selected, the low-delay path defragmentation unit 112 reallocates the wavelength path to the reallocation destination wavelength (S36).

In so doing, the low-delay path defragmentation unit 112 changes the used wavelength number and the allocation status of the reallocation target path of the path information DB 121. Also, the wavelength allocation status of the wavelength allocation management DB 122 is changed. In the specific example, since wavelength 2 is selected as the reallocation destination wavelength of path 2, a new path is created for wavelength 2.

The above operation is similarly executed for all the paths in the list (S37).

Specific Example of S40

Next, a specific example of S40 (wavelength reallocation of the normal path) under the usage of the wavelengths shown in FIG. 17 will be described. The path information DB 121 at this time is as shown in FIG. 18.

The procedure below specifically describes the procedures of S41 to S47 in the flowchart shown in FIG. 7. In the following description of the procedure, step numbers in the flowchart shown in FIG. 7 will be described as appropriate.

The normal path defragmentation unit 114 extracts paths whose attributes are normal, from the path information DB 121 shown in FIG. 18, and creates a list of the paths sorted in descending order of bandwidth and path length (S41, S42). In the specific example, paths 6 and 4 are stored in order from the top of the list.

Next, the normal path defragmentation unit 114 searches for the wavelengths of wavelength path reallocation destination candidates in order from the top of the list (S43, S44, S45). In the specific example, first, the wavelengths of reallocation candidates are searched for path 6 that is stored at the top of the list.

Since the normal path accommodates services with less delay and less reliability constraints, the route can be changed to improve the wavelength accommodation rate. Therefore, the path is first accommodated in the same route as the route stored in the path information DB 121 (flow shown in FIG. 7), and then the route is changed (flow shown in FIG. 8). First, the processing for accommodating the path in the same route as the route stored in the path information DB 121 will be described.

The normal path defragmentation unit 114 refers to the wavelength allocation management DB 122 and the path information DB 121 to confirm whether or not the wavelength is available in the route described in the path information DB 121 in ascending order of wavelength number, and selects the available wavelength with the smallest wavelength number as the reallocation destination wavelength.

In the specific example, since links AB, BE, and EH can be used for wavelength 2 and wavelength 3 for path 6 with bandwidth 2, wavelength 2 and wavelength 3 are selected as the reallocation destination wavelengths of path 6. Therefore, since the reallocation destination wavelengths are selected, the normal path defragmentation unit 114 reallocates the wavelength path to the reallocation destination wavelengths (S46).

In so doing, the normal path defragmentation unit 114 changes the used wavelength number and the allocation status of the reallocation target path of the path information DB 121. Also, the wavelength allocation status of the wavelength allocation management DB 122 is changed. In the specific example, since wavelength 2 and wavelength 3 are selected as the reallocation destination wavelengths of path 6, a new path is created for wavelength 2 and wavelength 3.

The normal path defragmentation unit 114 executes the above operation similarly to all paths of the list (S47).

Figure 17:
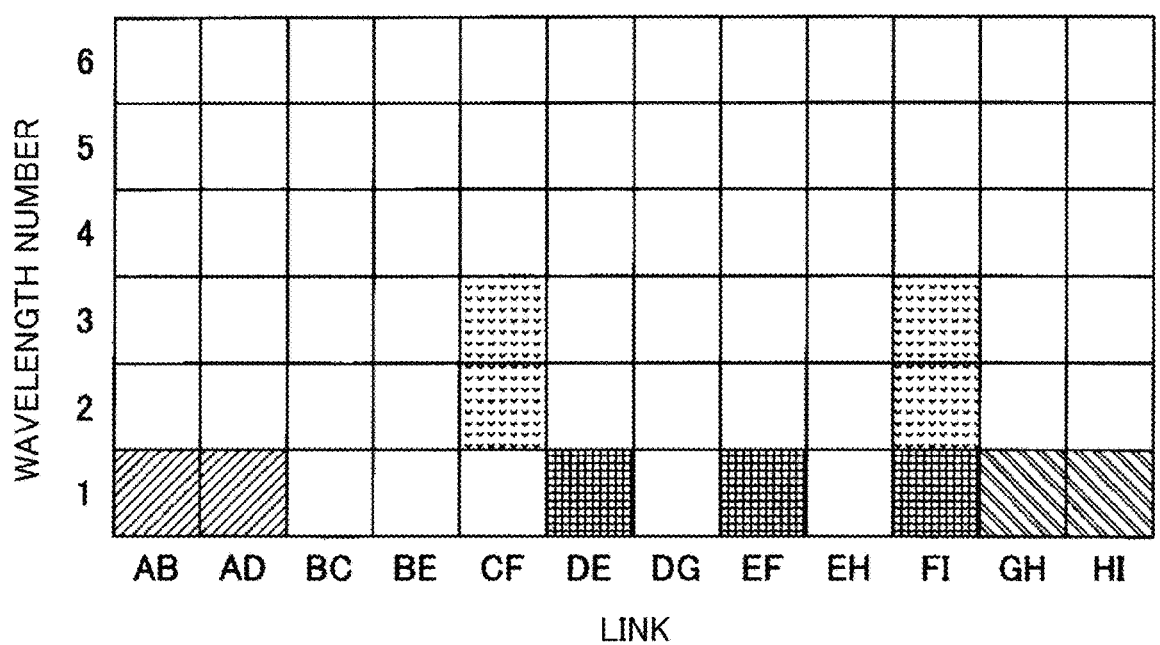
FIG. 17 is a diagram showing a usage of a wavelength in a specific example of S40.
Figure 19:
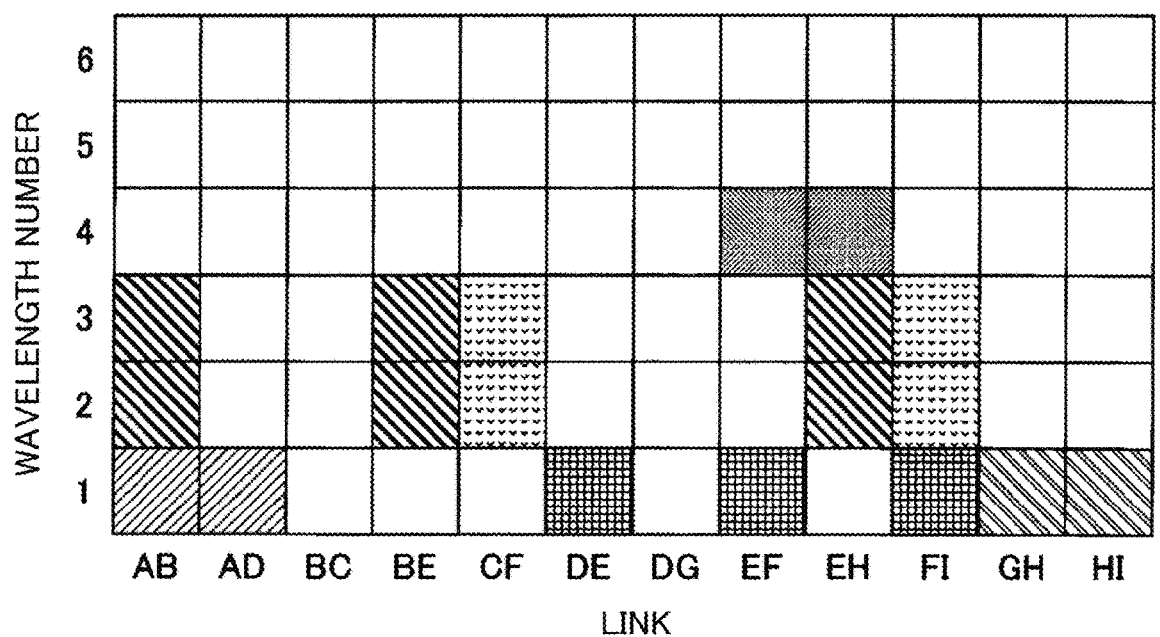
FIG. 19 is a diagram showing a usage of a wavelength in a specific example of S40.

For FIGS. 17 and 18, the status after applying the foregoing processing is shown in FIGS. 19 and 20 respectively.

Specific Example of S48

Next, a specific example of S48 (path rerouting and reallocation) under the wavelength usage shown in FIG. 19 will be described. The path information DB 121 at this time is as shown in FIG. 20.

Figure 8:
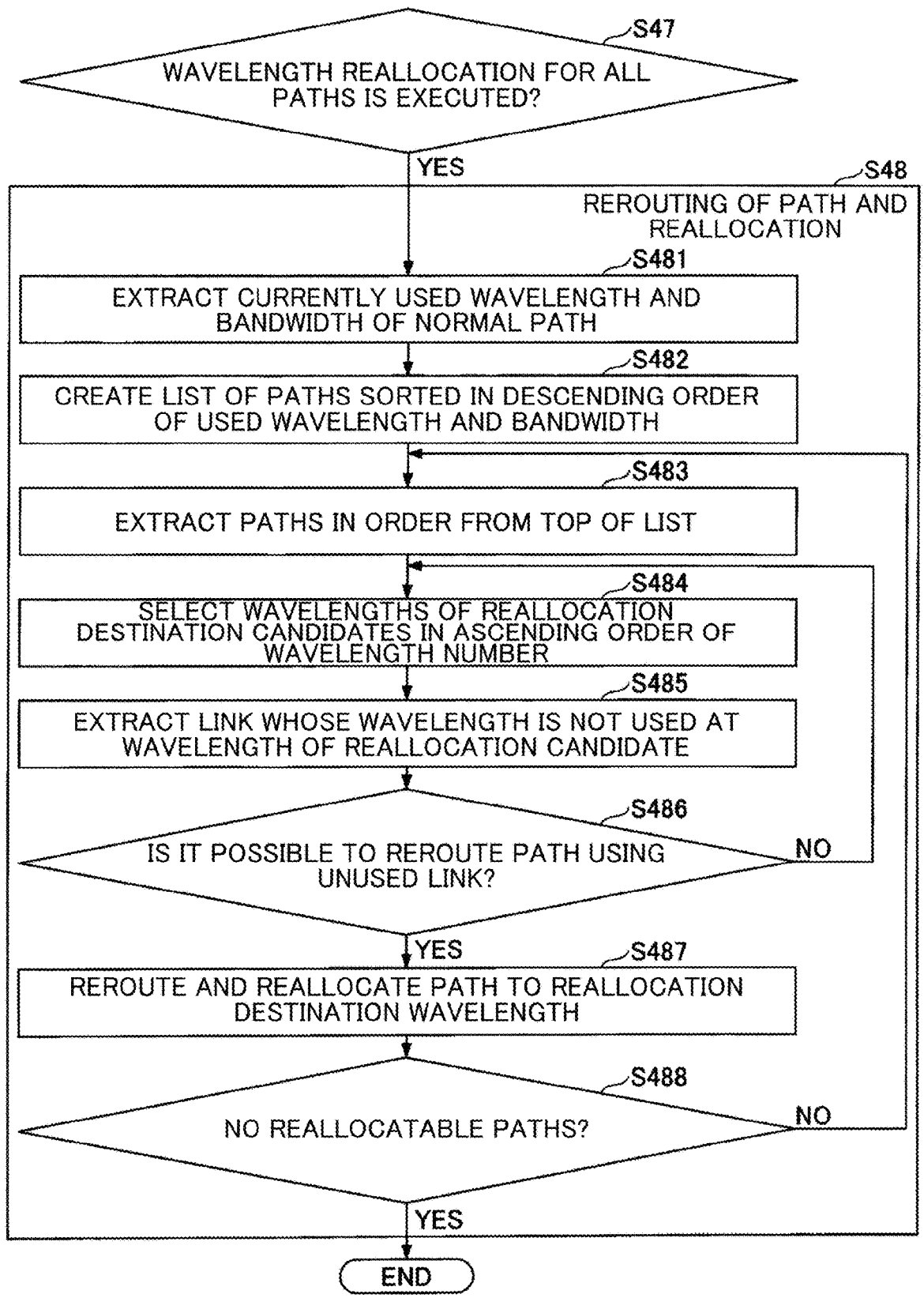
FIG. 8 is a flowchart of path rerouting and reallocation processing.

The procedure below specifically describes the procedures of S481 to S488 in the flowchart shown in FIG. 8. In the following description of the procedure, step numbers in the flowchart shown in FIG. 8 will be described as appropriate.

The normal path defragmentation unit 114 extracts paths whose attributes are normal, from the path information DB 121 shown in FIG. 18, and creates a list of the paths sorted in descending order of currently used wavelength number and bandwidth (S481, S482). In the specific example, paths 4 and 6 are stored in order from the top of the list.

Next, the normal path defragmentation unit 114 searches for the wavelengths and routes of wavelength path reallocation destination candidates in order from the top of the list (S483 to S486). In the specific example, the wavelengths and routes of the reallocation candidates are first searched for path 4 stored at the top of the list.

At this time, the wavelengths of the reallocation destination candidates are selected in ascending order of wavelength number (S484), and unused links are extracted from the wavelength allocation management DB 122 at the wavelengths of the reallocation destination candidates (S485). Further, when routes can be constructed through only the extracted unused links, the shortest route and the wavelength among the constructed routes are selected as a new route and a reallocation destination wavelength (S486).

In the specific example, for path 4 with bandwidth 1, a route passing through a link GH, a link DG, a link DE, and a link EF can be used at wavelength 2, wavelength 2 is selected as a reallocation destination wavelength of path 4, and the route is changed to the link GH, the link DG, the link DE, and the link EF.

Thus, since the reallocation destination wavelength and the route are selected, the wavelength path is reallocated to the reallocation destination wavelength and the changed route (S487). At this time, the used wavelength number and the pass-through link of the reallocation target path of the path information DB 121 are changed. Also, the wavelength allocation status of the wavelength allocation management DB 122 is changed.

In the specific example, since wavelength 2 is selected as the reallocation destination wavelength of path 4, and the route for the link GH, the link DG, the link DE, and the link EF is selected, a new path is created for wavelength 2.

The normal path defragmentation unit 114 repeatedly executes the above operation until the used wavelength for all the paths in the list cannot be changed (S488).

Example of Hardware Configuration

The wavelength defragmentation apparatus 100 can be implemented, for example, by causing a computer to execute a program. This computer may be a physical computer or may be a virtual machine.

Specifically, the device can be implemented by executing a program corresponding to the processing executed by the device by using hardware resources such as a CPU and a memory that are built into the computer. The program can be recorded in a computer-readable recording medium (such as a portable memory) to be saved or distributed. It is also possible to provide the program through a network such as the Internet or email.

Figure 21:
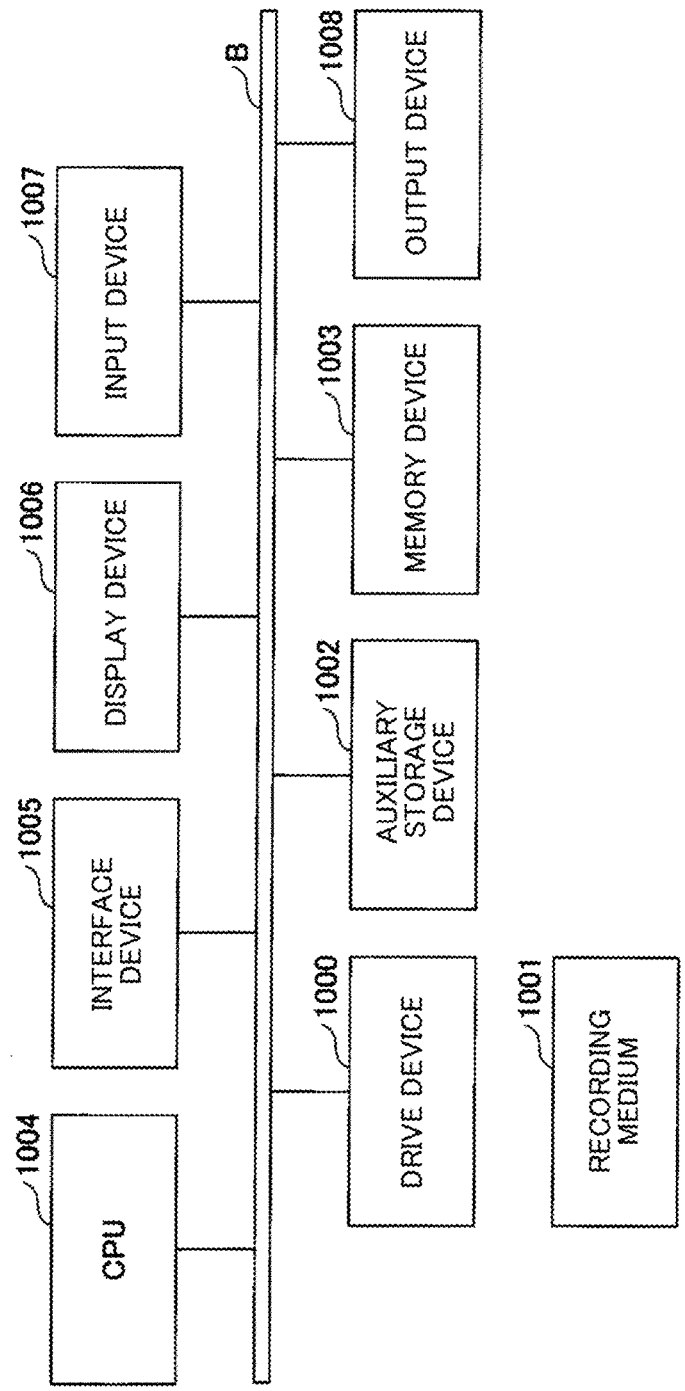
FIG. 21 is a diagram showing a hardware configuration example of a device.

FIG. 21 is a diagram showing an example of a hardware configuration of the above computer. The computer shown in FIG. 21 includes a drive device 1000, an auxiliary storage device 1002, a memory device 1003, a CPU 1004, an interface device 1005, a display device 1006, an input device 1007, and an output device 1008, which are connected to each other by a bus BS.

The program that implements processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program does not necessarily have to be installed from the recording medium 1001 and may be downloaded from another computer via a network. The auxiliary storage device 1002 stores the installed program and also stores necessary files, data, and the like.

The memory device 1003 reads and stores the program from the auxiliary storage device 1002 when there is an instruction to start the program. The CPU 1004 implements functions related to the device according to the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, or the like and is used for inputting various operation instructions. The output device 1008 outputs a calculation result.

Effects of Embodiment

As described above, in the present embodiment, since the operation corresponding to the attribute of an optical path is performed when the optical path is reallocated by wavelength defragmentation, the wavelength defragmentation in accordance with the required quality of each optical path becomes possible, realizing more flexible wavelength utilization.

Further, since uninterrupted defragmentation can be applied to a highly reliable path in which instantaneous interruption of a service is not permitted, wavelength utilization efficiency can be improved.

Conclusion of Embodiment

The present specification discloses, at least, a wavelength defragmentation apparatus, a wavelength defragmentation method, and a program according to each of the following clauses.

Clause 1

A wavelength defragmentation apparatus for executing wavelength reallocation on a path in an optical transmission network, the wavelength defragmentation apparatus comprising:
 a storage unit that stores a path information DB and a wavelength allocation management DB; and
 a wavelength defragmentation functional unit that refers to an attribute of a path from the path information DB and performs wavelength reallocation of a path having the attribute by an operation corresponding to the attribute.

Clause 2

The wavelength defragmentation apparatus according to claim 1, wherein the wavelength defragmentation functional unit refers to the wavelength allocation management DB in wavelength reallocation for a high-reliability path, to confirm whether or not wavelengths are continuously available up to a currently used wavelength, in ascending order of wavelength number, and selects, as a reallocation destination wavelength, a wavelength having the smallest wavelength number capable of ensuring that the wavelengths are continuously available.

Clause 3

The wavelength defragmentation apparatus according to claim 1 or 2, wherein the wavelength defragmentation functional unit refers to the wavelength allocation management DB and the path information DB in wavelength reallocation for a low-delay path, confirms whether or not a wavelength is available in a route of the low-delay path described in the path information DB in ascending order of wavelength number, and selects a available wavelength having the smallest wavelength number as a reallocation destination wavelength.

Clause 4

The wavelength defragmentation apparatus according to any one of claims 1 to 3, wherein the wavelength defragmentation functional unit refers to the wavelength allocation management DB and the path information DB in wavelength reallocation for a normal path, to confirm whether or not a wavelength is available in a route of the normal path described in the path information DB in ascending order of wavelength number, selects a available wavelength having the smallest wavelength number as a reallocation destination wavelength, accommodates the normal path in the reallocation destination wavelength, and reroutes the normal path Clause 5

The wavelength defragmentation apparatus according to claim 3 or 4, wherein in wavelength reallocation, the wavelength defragmentation functional unit determines a priority of reallocation according to a descending order of length of a route in which a path passes from a starting node to an ending node or a descending order of bandwidth used by a path.

Clause 6

A wavelength defragmentation method by a wavelength defragmentation apparatus that includes a storage unit for storing path information DB and a wavelength allocation management DB and executes wavelength reallocation on a path in an optical transmission network, the wavelength defragmentation method comprising:
  referring to an attribute of a path from the path information DB to execute wavelength reallocation of a path having the attribute by an operation corresponding to the attribute.

Clause 7

A program causing a computer to function as each unit of the wavelength defragmentation apparatus according to any one of clauses 1 to 5.

Although the present embodiment has been described above, the present invention is not limited to such specific embodiment, and various modifications and changes can be made within the scope of the gist of the present invention described in the claims.

REFERENCE SIGNS LIST

100 Wavelength defragmentation apparatus
110 Wavelength defragmentation functional unit
111 Wavelength cancellation unit
112 High-reliability path defragmentation unit
113 Low-delay path defragmentation unit
114 Normal path defragmentation unit
120 Storage unit
121 Path information DB
122 Wavelength allocation management DB
130 Input/output functional unit
131 Input unit
132 Output unit
200 Optical transmission network
1000 Drive device
1001 Recording medium
1002 Auxiliary storage device
1003 Memory device
1004 CPU
1005 Interface device
1006 Display device
1007 Input device

The invention claimed is:

1. A wavelength defragmentation apparatus for executing wavelength reallocation for a path in an optical transmission network, the wavelength defragmentation apparatus comprising:
  a memory configured to store a path information database (DB) and a wavelength allocation management DB; and
  a processor coupled to the memory and configured to refer to an attribute of a path from the path information DB and perform wavelength reallocation of a path having the attribute by an operation corresponding to the attribute,
  wherein the processor is configured to determine, for a high-reliability path, whether all wavelengths from a currently used wavelength to a candidate reallocation destination wavelength are continuously available based on the wavelength allocation management DB, and reallocates the path using Push-Pull technology while maintaining data transmission on the path.

2. The wavelength defragmentation apparatus according to claim 1, wherein the processor is configured to refer to the wavelength allocation management DB in wavelength reallocation for a high-reliability path, to confirm whether or not wavelengths are continuously available up to a currently used wavelength, in ascending order of wavelength number, and select, as a reallocation destination wavelength, a wavelength having a smallest wavelength number capable of ensuring that the wavelengths are continuously available.

3. The wavelength defragmentation apparatus according to claim 1, wherein the processor is configured to refer to the wavelength allocation management DB and the path information DB in wavelength reallocation for a low-delay path, confirm whether or not a wavelength is available in a route of the low-delay path described in the path information DB in ascending order of wavelength number, and select an available wavelength having a smallest wavelength number as a reallocation destination wavelength.

4. The wavelength defragmentation apparatus according to claim 3, wherein in the wavelength reallocation, the processor is configured to determine a priority of reallocation according to a descending order of length of a route in which a path passes from a starting node to an ending node or a descending order of bandwidth used by a path.

5. The wavelength defragmentation apparatus according to claim 1, wherein the processor is configured to refer to the wavelength allocation management DB and the path information DB in wavelength reallocation for a normal path, to confirm whether or not a wavelength is available in a route of the normal path described in the path information DB in ascending order of wavelength number, select an available wavelength having a smallest wavelength number as a reallocation destination wavelength, accommodate the normal path in the reallocation destination wavelength, and reroute the normal path.

6. The wavelength defragmentation apparatus according to claim 1, wherein the processor is further configured to, for a normal path, analyzes wavelength usage across multiple links based on the wavelength allocation management DB, and select a new route and wavelength for the path such that the path is rerouted through a series of unused links ensuring connectivity.

7. The wavelength defragmentation apparatus according to claim 1, wherein the high-reliability path is defined as a path in which instantaneous interruption of a service is not permitted, and the normal path is defined as a path in which the instantaneous interruption is permitted.

8. A wavelength defragmentation method executed by a wavelength defragmentation apparatus that includes a memory storing path information database (DB) and a wavelength allocation management DB and executes wavelength reallocation for a path in an optical transmission network, the wavelength defragmentation method comprising:
referring to an attribute of a path from the path information DB to execute wavelength reallocation of a path having the attribute by an operation corresponding to the attribute,
wherein the wavelength defragmentation method further comprises,
determining, for a high-reliability path, whether all wavelengths from a currently used wavelength to a candidate reallocation destination wavelength are continuously available based on the wavelength allocation management DB, and
reallocating the path using Push-Pull technology while maintaining data transmission on the path.

9. A non-transitory computer-readable recording medium storing a program for causing a computer to perform the wavelength defragmentation method according to claim 8.

* * * * *